United States Patent
Ye et al.

(10) Patent No.: US 10,764,038 B2
(45) Date of Patent: Sep. 1, 2020

(54) METHOD AND APPARATUS FOR GENERATING TERMINAL KEY

(71) Applicant: TENCENT TECHNOLOGY (SHENZHEN) COMPANY LIMITED, Shenzhen (CN)

(72) Inventors: Xuan Ye, Shenzhen (CN); Wenzhu Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 240 days.

(21) Appl. No.: 15/950,769

(22) Filed: Apr. 11, 2018

(65) Prior Publication Data

US 2018/0234235 A1 Aug. 16, 2018

Related U.S. Application Data

(63) Continuation of application No. PCT/CN2017/070476, filed on Jan. 6, 2017.

(30) Foreign Application Priority Data

Jan. 8, 2016 (CN) .......................... 2016 1 0013657

(51) Int. Cl.
*H04L 29/06* (2006.01)
*H04L 9/08* (2006.01)
(Continued)

(52) U.S. Cl.
CPC .......... *H04L 9/0825* (2013.01); *G06F 21/602* (2013.01); *H04L 9/083* (2013.01);
(Continued)

(58) Field of Classification Search
CPC ..... H04L 63/06; H04L 63/061; H04L 63/062; H04L 63/065; H04L 63/08; H04L 63/083;
(Continued)

(56) References Cited

U.S. PATENT DOCUMENTS

2005/0251680 A1* 11/2005 Brown ................. H04L 63/061
713/171
2006/0155990 A1 7/2006 Katsube et al.
(Continued)

FOREIGN PATENT DOCUMENTS

| CN | 1294457 A | 5/2001 |
| CN | 1839581 A | 9/2006 |
| CN | 104106235 A | 10/2014 |
| CN | 105007285 A | 10/2015 |
| CN | 105488433 A | 4/2016 |

OTHER PUBLICATIONS

The World Intellectual Property Organization (WIPO) International Search Report for PCT/CN2017/070476 dated Apr. 17, 2017 6 Pages (including translation).

(Continued)

*Primary Examiner* — Edward Zee
(74) *Attorney, Agent, or Firm* — Anova Law Group, PLLC

(57) ABSTRACT

A method for generating a terminal key includes calling a terminal key generation instruction through an interface provided by the driver, generating the terminal key in response to the terminal key generation instruction, and deleting the driver from the terminal when the terminal key has been successfully generated.

20 Claims, 10 Drawing Sheets

(51) Int. Cl.
*H04L 9/32* (2006.01)
*G06F 21/60* (2013.01)
*H04L 9/30* (2006.01)
*G06F 21/74* (2013.01)
*H04W 12/04* (2009.01)

(52) U.S. Cl.
CPC .............. *H04L 9/0863* (2013.01); *H04L 9/30* (2013.01); *H04L 9/3226* (2013.01); *H04L 63/06* (2013.01); *H04L 63/062* (2013.01); *H04L 63/065* (2013.01); *G06F 21/74* (2013.01); *H04W 12/04* (2013.01)

(58) Field of Classification Search
CPC ....... H04L 9/08; H04L 9/0816; H04L 9/0819; H04L 9/0861
See application file for complete search history.

(56) References Cited

U.S. PATENT DOCUMENTS

2009/0106563 A1* 4/2009 Cherpantier ............ G06F 21/86
 713/194
2010/0067689 A1* 3/2010 Laffey .................. H04L 9/0877
 380/44

OTHER PUBLICATIONS

The State Intellectual Property Office of the People's Republic of China (SIPO) Office Action 1 for 201610013657.0 dated Dec. 28, 2016 19 Pages (including translation).

* cited by examiner

METHOD AND APPARATUS FOR GENERATING TERMINAL KEY

CROSS-REFERENCE TO RELATED APPLICATIONS

This application is a continuation application of PCT International Application No. PCT/CN2017/070476, filed on Jan. 6, 2017, which claims priority to Chinese Patent Application No. 201610013657.0, entitled "METHOD AND APPARATUS FOR GENERATING TERMINAL KEY" filed with the Chinese Patent Office on Jan. 8, 2016, the entire contents of both of which are incorporated by reference.

FIELD OF THE TECHNOLOGY

The present disclosure relates to the field of terminal technologies and, in particular, to a method and an apparatus for generating a terminal key.

BACKGROUND OF THE DISCLOSURE

With the constant development of terminal technologies, a growing number of functions can be implemented by using third-party applications installed on a terminal. The third-party applications usually involve the privacy and property security of a user when performing information interaction with the terminal. Moreover, when performing data interaction with the terminal, the third-party applications usually need to obtain a public key of a terminal key to encrypt and decrypt data. Therefore, generating a key with higher security has become one of important methods for improving the security of the terminal.

In conventional technologies, a key provider server generates a terminal key by calling a driver interface that generates the terminal key. However, with this key-generating method, after a terminal is delivered, the driver interface that generates the terminal key is exposed outside. A malicious program or individual can find a command identification code corresponding to the driver interface and, according to the command identification code, call the driver interface that generates the terminal key to modify the terminal key that has been generated and stored. This causes a private key of the terminal key to be not paired with a public key of the terminal key, and hence all operations related to the terminal key cannot be performed, leading to a relatively low security of the terminal.

SUMMARY

In accordance with the disclosure, there is provided a method for generating a terminal key including installing a driver on a terminal, calling a terminal key generation instruction through an interface provided by the driver, generating the terminal key in response to the terminal key generation instruction, and deleting the driver from the terminal when the terminal key has been successfully generated.

Also in accordance with the disclosure, there is provided an apparatus for generating a terminal key including a processor and a memory storing instructions that, when executed by the processor, cause the processor to install a driver on a terminal, call a terminal key generation instruction through an interface provided by the driver, generate the terminal key in response to the terminal key generation instruction, and delete the driver from the terminal when the terminal key has been successfully generated.

Also in accordance with the disclosure, there is provided a non-transitory computer-readable storage medium storing instructions that, when executed by the processor, cause the processor to install a driver on a terminal, call a terminal key generation instruction through an interface provided by the driver, generate the terminal key in response to the terminal key generation instruction, and delete the driver from the terminal when the terminal key has been successfully generated.

Also in accordance with the disclosure, there is provided a method for generating a terminal key including calling a terminal key generation instruction through a driver provided on a terminal to generate the terminal key by the terminal in response to the terminal key generation instruction, and deleting the driver from the terminal after a specified number of unsuccessful attempts to generate the terminal key.

BRIEF DESCRIPTION OF THE DRAWINGS

To more clearly describe the technical solutions of the embodiments of the present disclosure, drawings accompanying the present disclosure are briefly described as follow. Apparently, the accompanying drawings in the following description show only some embodiments of the present disclosure, and a person of ordinary skill in the art may derive other drawings from these accompanying drawings without creative efforts.

DESCRIPTION OF EMBODIMENTS

To make the objective, technical solutions, and advantages of the present disclosure clearer, implementations of the present disclosure are further described in detail below with reference to the accompanying drawings.

Exemplary embodiments are described in detail herein, and the embodiments are illustratively shown in the accompanying drawings. When the following descriptions relate to the accompanying drawings, unless otherwise indicated, same numbers in different accompanying drawings represent same or similar elements. Implementations described in the following exemplary embodiments do not represent all implementations consistent with the present disclosure. In contrast, the implementations described in the following exemplary embodiments are merely examples of apparatuses and methods consistent with some aspect of the present disclosure.

Figure 1:
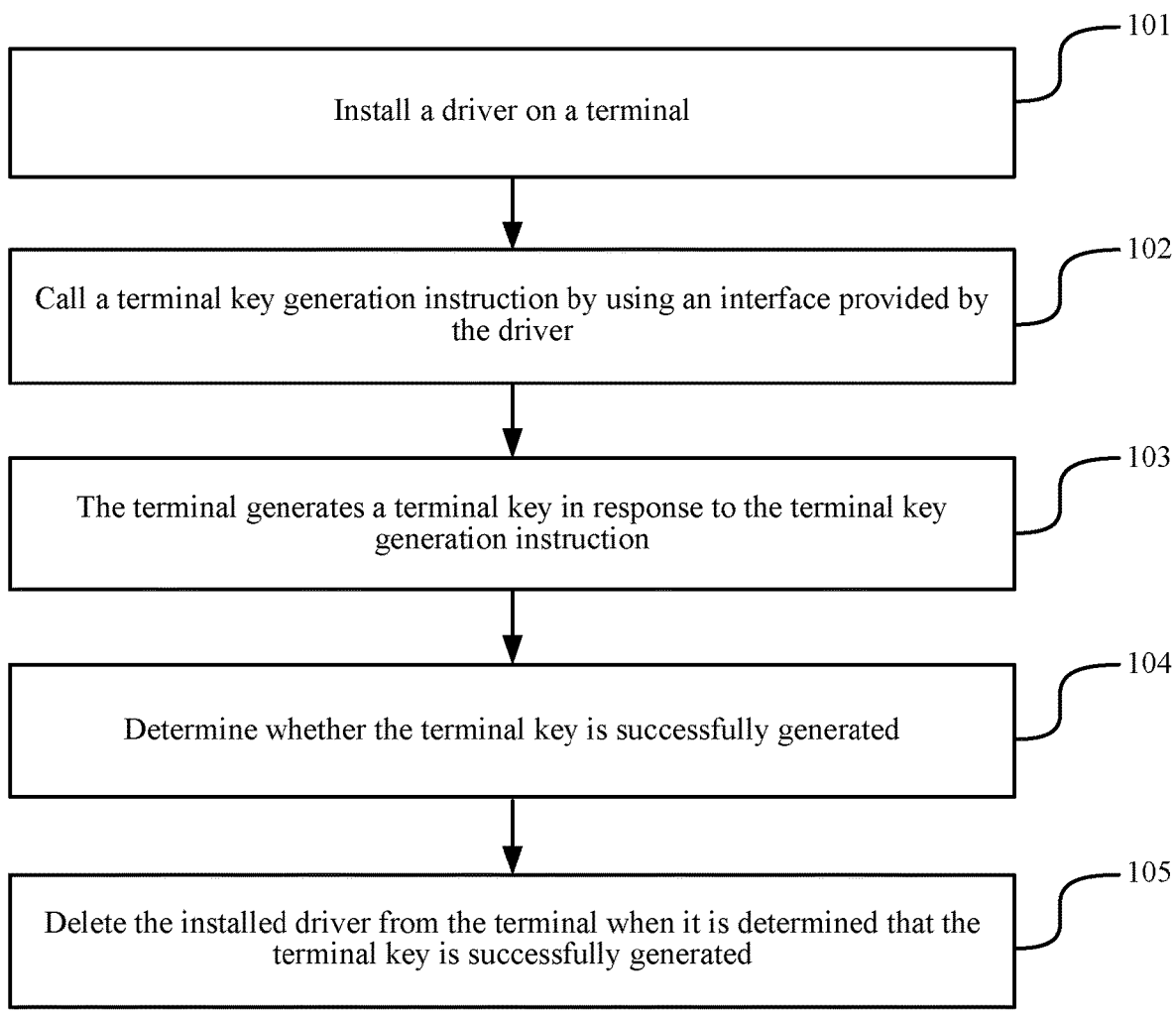
FIG. 1 is a flowchart of a method for generating a terminal key according to an embodiment of the present disclosure.

FIG. 1 is a flowchart of a method for generating a terminal key according to an embodiment of the present disclosure. As shown in FIG. 1, at 101, a specified driver is installed on a terminal. At 102, a terminal key generation instruction is called by using an interface provided by the specified driver. At 103, the terminal generates the terminal key in response to the terminal key generation instruction. At 104, whether the terminal key is successfully generated is determined. At 105, the installed specified driver is deleted from the terminal when it is determined that the terminal key is successfully generated.

According to methods consistent with embodiments of the present disclosure, by deleting the specified driver and an installation package of the specified driver from the terminal, an unauthorized user or an unauthorized program can be prevented from calling the terminal key generation instruction using the interface provided by the specified driver after the terminal is delivered. As such, the possibility of the terminal key in the terminal being tampered with is reduced, thereby improving the security of the terminal.

In some embodiments, a calling password can be set for the interface provided by the specified driver, which can be used to verify a caller of the interface provided by the specified driver.

In some embodiments, the terminal key includes an asymmetric key. In these embodiments, after the installed specified driver is deleted from the terminal when it is determined that the terminal key is successfully generated, a public key of the terminal key can be exported and uploaded to a key management server configured to manage public keys of terminal keys.

In some other embodiments, the terminal key includes a symmetric key. In these embodiments, after the installed specified driver is deleted from the terminal when it is determined that the terminal key is successfully generated, the terminal key can be exported and uploaded to the key management server configured to manage public keys of terminal keys.

In some embodiments, before the specified driver is installed on the terminal, an installation package of the specified driver can be imported into the terminal. In these embodiments, after the installed specified driver is deleted from the terminal when it is determined that the terminal key is successfully generated, the installation package of the specified driver can be deleted from the terminal.

In some embodiments, calling the terminal key generation instruction by using the interface provided by the specified driver includes receiving, by the terminal, a call request sent by a key provider server and calling, by the terminal in response to the call request, the terminal key generation instruction by using the interface provided by the specified driver.

In some embodiments, the terminal key is validated or becomes valid after the deletion of the driver is confirmed. In some embodiments, a public key corresponding to the terminal key is generated after confirmation of successful deletion of the driver. In some embodiments, a signal indicating a successful deletion of the driver is generated and/or transmitted by the terminal. In some embodiments, a signal indicating an unsuccessful deletion of the driver is generated and/or transmitted by the terminal. In some embodiments, the driver and/or a portion thereof is deleted, disabled, or rendered inoperable (e.g. corrupted) after the terminal key generation. In some embodiments, the driver and/or a portion thereof is uninstalled, deleted, disabled, or rendered inoperable (e.g. corrupted) after a predetermined number of unsuccessful or failed attempts to generate the terminal key. In some embodiments, the driver is pre-loaded, downloaded, copied, or otherwise transferred to the terminal and accessed or used to generate the terminal key. In some embodiments, the driver is preloaded or installed on the terminal before it is delivered to the user. In some embodiments, the driver is provisioned to the terminal to generate the terminal key.

The foregoing optional technical solutions may be combined, in any proper form, into an optional embodiment of the present disclosure, and details are not described herein again.

Figure 2:
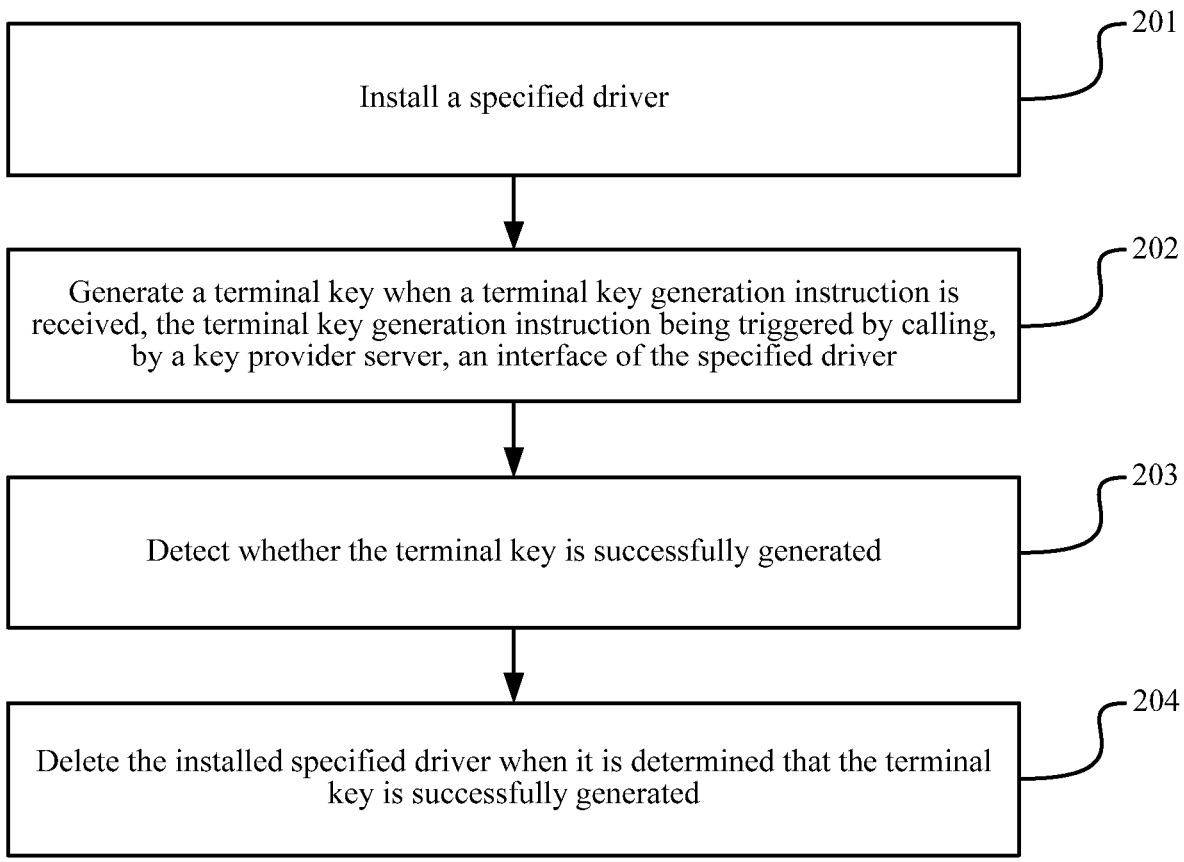
FIG. 2 is a flowchart of a method for generating a terminal key according to another embodiment of the present disclosure.

FIG. 2 is a flowchart of a method for generating a terminal key according to another embodiment of the present disclosure. As shown in FIG. 2, at 201, a specified driver is installed. At 202, a terminal key is generated when a terminal key generation instruction is received. The terminal key generation instruction is triggered by a key provider server calling an interface of the specified driver. At 203, whether the terminal key is successfully generated is determined. At 204, the installed specified driver is deleted when it is determined that the terminal key is successfully generated.

In some embodiments, after the installed specified driver is deleted, an installation package of the specified driver can be deleted.

In some embodiments, a calling password set by the key provider server for the interface provided by the specified driver can be stored, which can be used to verify a caller of the interface provided by the specified driver.

In some embodiments, when a call request from the caller of the interface provided by the specified driver is received, before the terminal generates the terminal key in response to the terminal key generation instruction, it can be determined whether a password entered by the caller is the same as the stored calling password. If the entered password is the same as the stored calling password, the terminal key generation instruction can be called by using the interface provided by the driver. If the entered password is different from the calling password, the call request can be ignored.

The foregoing optional technical solutions may be combined, in any proper form, into an optional embodiment of the present disclosure, and details are not described herein again.

Figure 3:
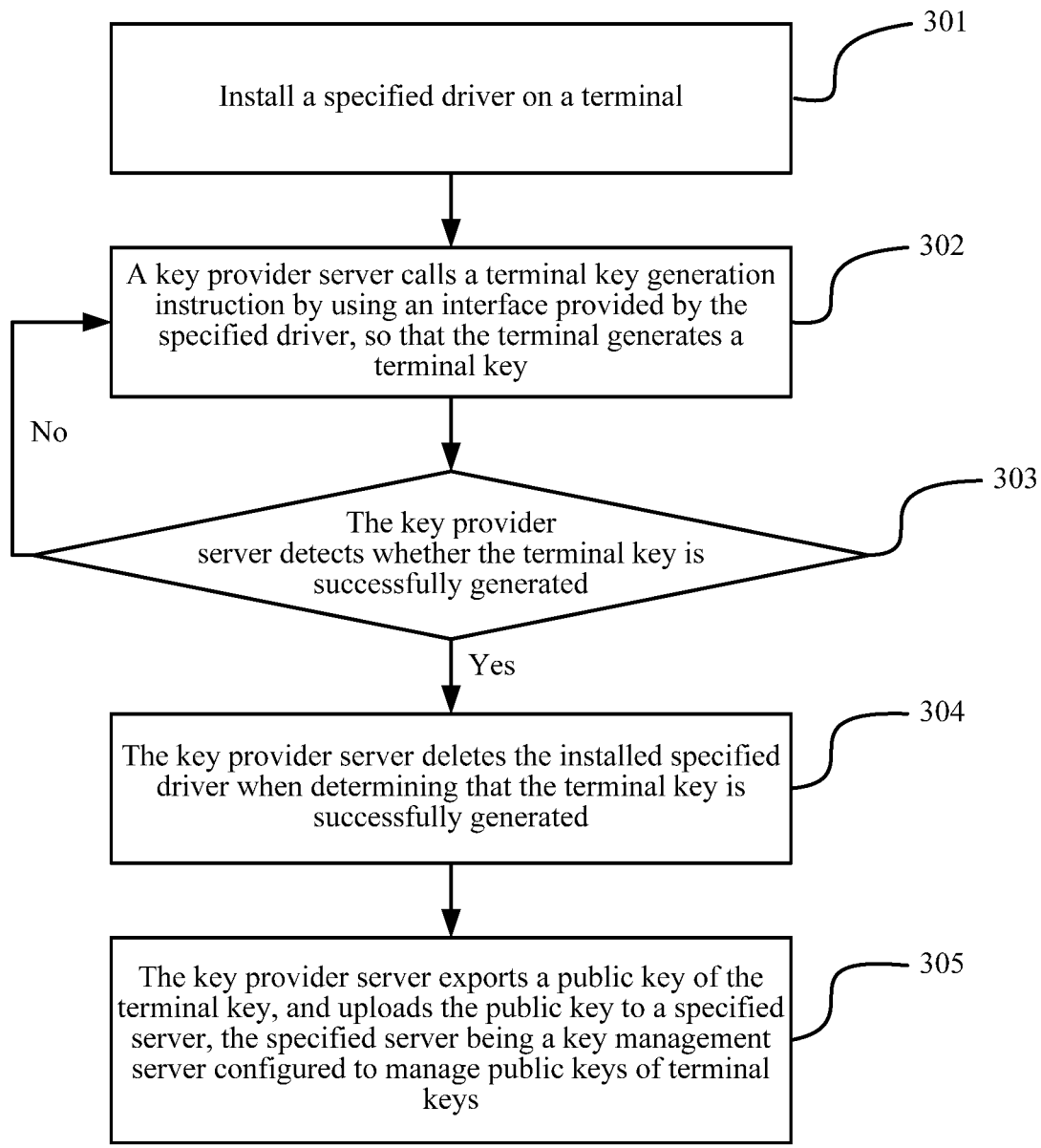
FIG. 3 is a flowchart of a method for generating a terminal key according to another embodiment of the present disclosure.

FIG. 3 is a flowchart of a method for generating a terminal key according to another embodiment of the present disclosure. As shown in FIG. 3, at 301, a terminal installs a specified driver.

A key provider server can import an installation package of the specified driver into the terminal. The terminal can install the specified driver according to the installation package of the specified driver. The specified driver can be configured to provide an interface for calling a terminal key generation instruction. The installation package of the specified driver can include at least a file required for installing the specified driver, and may also include another file, which is not restricted in the present disclosure.

In some embodiments, the installation package of the specified driver may be imported into the terminal by using a production line tool. The production line tool is a tool for importing and deleting a driver, and may also be configured to implement another function, which is not restricted in the present disclosure. In some other embodiments, the installation package of the specified driver can be imported into the terminal using another manner, which is not restricted in the present disclosure.

The process of installing the specified driver may be performed under control of the key provider server. That is, the key provider server can import the installation package of the specified driver, and issue an installation instruction to trigger an installation process based on the installation package of the specified driver. In some other embodiments, the installation package of the specified driver may be set to start the installation process once being imported into the terminal, without the installation instruction issued by the key provider server. The present disclosure does not restrict how the installation process is triggered.

At 302, the key provider server calls the terminal key generation instruction by using the interface provided by the specified driver, causing the terminal to generate the terminal key.

The key provider server can call the terminal key generation instruction by using the interface provided by the specified driver, so that the terminal can generate the terminal key of the terminal when receiving the terminal key generation instruction.

In some embodiments, the terminal key can be generated by calling the terminal key generation instruction through a trusted application (TA) interface for generating terminal keys, which runs in a terminal trusted execution environment (TEE). A logic action and a storage action of the TA are both secure actions. The TEE may be considered as another operating system in the terminal. An operating environment of the operating system is a trusted environment. Data processed in the TEE is independent of a visible operating system of the terminal. In some other embodiments, another method may be used to generate the terminal key in the terminal. The present disclosure does not restrict the method for generating the terminal key.

In some other embodiments, to prevent a subsequent unauthorized user from tampering with the key, the key provider server may set, in an initial calling process after installation, a calling password of the interface provided by the specified driver, to further ensure the security. That is, the method can further include setting a calling password for the interface provided by the specified driver. The calling password can be configured to verify a caller of the interface provided by the specified driver.

The foregoing calling password can be set using one of various suitable methods, as described below.

In some embodiments, the calling password is written, as a password parameter in the TA for generating terminal keys, into a program for generating the terminal key.

By writing the call password as the password parameter into the program for generating the terminal key, it can be ensured that an unauthorized user or program cannot call the terminal key generation instruction by using the interface provided by the specified driver. Moreover, password parameters of programs for generating terminal keys in different terminals may be set to different calling passwords, so that different calling passwords can be set for terminals with different security requirements. The foregoing method is suitable for the terminal.

In some other embodiments, a terminal manufacturer sets the calling password in the terminal by using a production line tool.

Calling the interface provided by the specified driver using the calling password allows the terminal manufacturer to generate terminal keys in batches by using the secret production line. Moreover, after the terminal is delivered, an unauthorized user or an unauthorized program cannot call the interface of the specified driver in the terminal by using the secret production line. As such, the problem of terminal insecurity caused by terminal key tampering can be further avoided.

In some other embodiments, the terminal stores the calling password set by the key provider server for the interface provided by the specified driver. The calling password can be configured to verify the caller of the interface provided by the specified driver. By storing the calling password, the terminal, after being delivered, can verify the caller of the interface provided by the specified driver according to the calling password when receiving a call request for the interface of the specified driver. This can further prevent an unauthorized user or an unauthorized program from tampering with the terminal key that has been generated by the terminal. The verification process can be implemented in one of various suitable manners. In some embodiments, when the terminal is being used, if the terminal detects that any calling end calls the terminal key generation instruction by using the interface provided by the specified driver, the terminal sends a password input instruction to the calling end, so that the calling end displays a password input interface. If the terminal detects that a password input by the calling end is the same as the calling password, the terminal can generate the terminal key. If the terminal detects that the password input by the calling end is different from the calling password, the terminal makes no response, i.e., ignores the call request, or returns a prompt message indicating a calling failure. The present disclosure does not restrict this. In some embodiments, if the password input by the calling end is different from the calling password, the driver and/or a portion thereof is uninstalled, deleted, disabled, or rendered inoperable (e.g. corrupted) after one or a predetermined number of unsuccessful or failed password input attempts. In some embodiments, the driver and/or a portion thereof is disabled or rendered inoperable permanently. In some embodiments, a signal indicating an unsuccessful or failed password input attempt is generated and/or transmitted by the terminal. In some embodiments, a signal indicating each unsuccessful or failed password input attempt is generated and/or transmitted by the terminal.

According to the disclosure, an unauthorized user can be prevented from calling the terminal key generation instruction of the terminal, so that the possibility of the terminal key being tampered with by a malicious program after the terminal is delivered can be reduced. Moreover, the calling end can simultaneously call terminal key generation instructions of multiple terminals having a same calling passwords so that the multiple terminals simultaneously generate terminal keys. As such, the efficiency of generating, by a terminal manufacturer, terminal keys can be further improved.

The process of verifying, according to the calling password stored in the terminal, the caller of the interface provided by the specified driver in the terminal may be implemented by using another method, which is not restricted in the present disclosure.

303: The key provider server detects whether the terminal key is successfully generated. If the terminal key is successfully generated, the key provider server performs the process at 304. If the terminal key is not successfully generated, the key provider server executes the generation process again. In some embodiments, if the terminal key is not successfully generated, the generation process terminates. In some embodiments, if the terminal key is not successfully generated, the generation process terminates after a predetermined or preconfigured number of unsuccessful attempts.]

A method for detecting whether the terminal key is successfully generated may include the key provider server generating a key by using a same key generation method and key generation data, and comparing the generated key with the terminal key. If the generated key is the same as the terminal key, the key provider server determines that the terminal key is successfully generated, and performs the process at 304. If the generated key is different from the terminal key, the key provider server determines that the terminal key is not successfully generated, and performs the process at 302. In some embodiments, if the terminal key is not successfully generated, the generation process terminates. In some embodiments, if the terminal key is not successfully generated, the generation process terminates after a predetermined or preconfigured number of unsuccessful attempts.

The process of detecting whether the terminal key is successfully generated may be implemented by using another method, which is not restricted in the present disclosure.

By detecting whether the terminal key is successfully generated, normal use of the terminal key after the terminal is delivered can be ensured. Further, the security of the terminal and the availability of the terminal during transmission of encrypted data can be ensured.

At 304, the key provider server deletes the installed specified driver when determining that the terminal key is successfully generated.

The installation package of the specified driver is deleted from the terminal when it is determined that the terminal key is successfully generated. Moreover, after the installed specified driver is deleted, the installation package of the specified driver is deleted.

The process of deleting the installed specified driver and the installation package of the specified driver may be implemented by using a production line tool, to further reduce the possibility of illegal calling of the interface of the specified driver, thereby further improving the security of the terminal. In some other embodiments, the specified driver and the installation package of the specified driver may be deleted in another manner, which is not restricted in the present disclosure.

By deleting or disabling the specified driver in the terminal and/or the installation package of the specified driver, after the terminal is delivered and/or after the terminal key is generated, an unauthorized user or an unauthorized program can be prevented from calling the terminal key generation instruction by using the interface provided by the specified driver. As such, the possibility of the terminal key in the terminal being tampered with is reduced. In some embodiments, a signal or alert indicating successful deletion and/or disablement of the driver and/or the installation package is generated and/or transmitted to an external device (e.g. a server or another terminal such as a terminal belonging to the same user which is programmed or configured to receive and/or process such signal or alert.)

At 305, the key provider server exports a public key of the terminal key, and/or uploads the public key to a specified server. The specified server is a key management server configured to manage public keys of terminal keys. In some embodiments, generation, upload and/or export of a public key of the terminal key is performed following a confirmation of successful creation of the terminal key and a confirmation of successful deletion or disabling of the driver, installation package of the driver and/or a portion thereof.

The key management server may be a trusted attestation key (ATTK) management server (TAM server), configured to manage storage, mapping, and signature of public keys of ATTKs. An ATTK is configured to verify the legality of a terminal. In some embodiments, one terminal has only one ATTK. In some embodiments, a private key of the ATTK is built in a secure area of the terminal before the terminal is delivered. The public key of the ATTK corresponds to the public key of the terminal key in the present disclosure. In some other embodiments, the key management server may include another server having a similar function, which is not restricted in the present disclosure.

The key generation method consistent with embodiments of the present disclosure is not only applicable to a case where the terminal key is an asymmetric key, but also applicable to a case where the terminal key is a symmetric key. If the terminal key is a symmetric key, the method for generating the terminal key by calling the terminal key generation instruction by using the interface provided by the specified driver is similar to the processes at 301 to 304 described above, and details are not repeated here. At 305, the terminal key is stored in the secure area of the terminal, and the terminal key is uploaded to the specified server.

By exporting and uploading the public key of the terminal key to the specified server, it can be ensured that when a third-party application server needs to perform data transmission with the terminal, the third-party application server can send a request for obtaining the public key of the terminal key to the key management server, to obtain the public key of the terminal key, thereby implementing encrypted data transmission between the third-party application server and the device.

In addition, in some embodiments, such as those described above with reference to 304 and 305, the installation package is first deleted, and then the public key is exported. In some other embodiments, deleting of the installation package can be performed after the public key is exported, or be performed simultaneously with exporting the public key, which is not restricted in the present disclosure.

According to the method for generating a terminal key consistent with embodiments of the present disclosure, by deleting the specified driver in the terminal and the installation package of the specified driver, after the terminal is delivered and/or after the creation of the terminal key, an unauthorized user or an unauthorized program can be prevented from calling the terminal key generation instruction by using the interface provided by the specified driver. As such, the possibility of the terminal key in the terminal being tampered with is reduced, thereby improving the security of the terminal. In some embodiments, deletion of the specified driver, the installation package of the specified driver and/or a portion thereof is performed after the terminal is delivered and/or after the creation of the terminal key. Further, by setting the calling password for the interface provided by the specified driver to verify the caller of the interface provided by the specified driver, the unauthorized user can be further prevented from calling the terminal key generation instruction of the terminal. As such, the possibility of the terminal key being tampered with by a malicious program after the terminal is delivered can be reduced. By exporting and uploading the public key of the terminal key to the specified server, it can be ensured that when a third-party application server needs to perform data transmission with the terminal, the third-party application server can send the request for obtaining the public key of the key to the key management server, to obtain the public key of the terminal key, thereby implementing encrypted data transmission between the third-party application server and the terminal.

Figure 4:
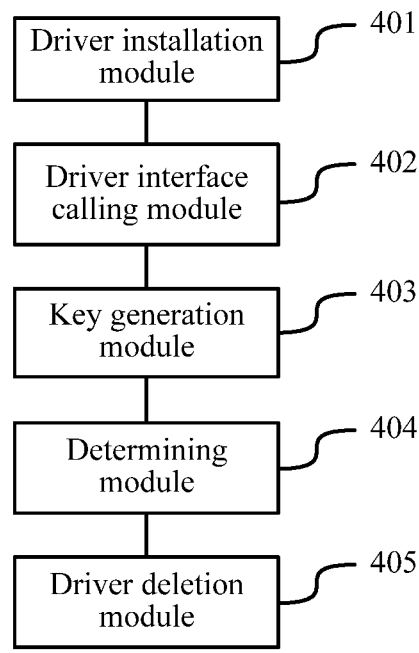
FIG. 4 is a block diagram of an apparatus for generating a terminal key according to an embodiment of the present disclosure.

FIG. 4 is a block diagram of an apparatus for generating a terminal key according to an embodiment of the present disclosure. As shown in FIG. 4, the apparatus includes a driver installation module 401, a driver interface calling module 402, a key generation module 403, a determining module 404, and a driver deletion module 405.

The driver installation module 401 is configured to install a specified driver on a terminal.

The driver interface calling module 402 is configured to call a terminal key generation instruction by using an interface provided by the specified driver installed by the driver installation module 401.

The key generation module 403 is configured to generate the terminal key in response to the terminal key generation instruction.

The determining module 404 is configured to determine whether the terminal key is successfully generated.

The driver deletion module 405 is configured to delete the installed specified driver from the terminal when the determining module 404 determines that the terminal key is successfully generated.

Figure 5:
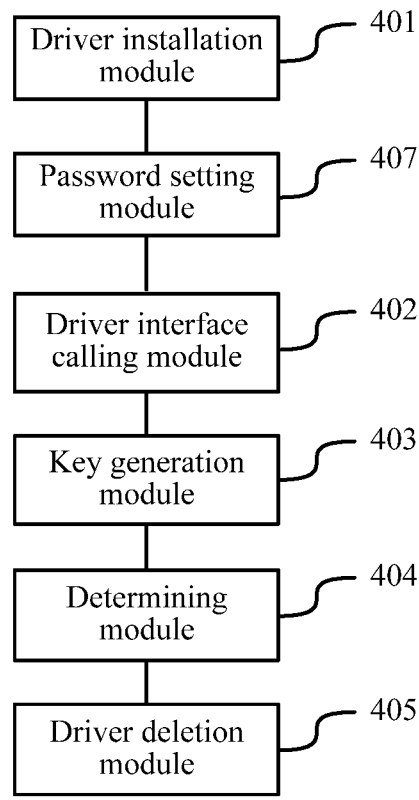
FIG. 5 is a block diagram of an apparatus for generating a terminal key according to another embodiment of the present disclosure.

FIG. 5 is a block diagram of an apparatus for generating a terminal key according to another embodiment of the present disclosure. The apparatus shown in FIG. 5 is similar to the apparatus shown in FIG. 4, except that the apparatus shown in FIG. 5 further includes a password setting module 407 configured to set a calling password for the interface provided by the specified driver. The calling password can be used to verify a caller of the interface provided by the specified driver.

Figure 6:
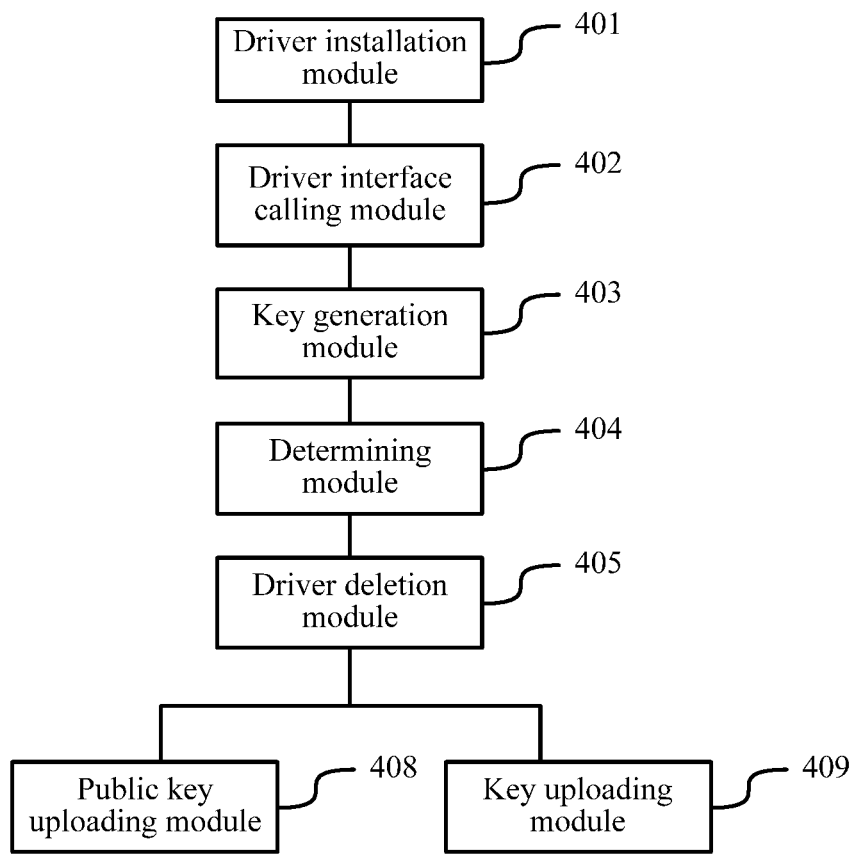
FIG. 6 is a block diagram of an apparatus for generating a terminal key according to another embodiment of the present disclosure.

FIG. 6 is a block diagram of an apparatus for generating a terminal key according to another embodiment of the present disclosure. The apparatus shown in FIG. 6 is similar to the apparatus shown in FIG. 4, except that the apparatus shown in FIG. 6 further includes a public key uploading module 408 and a key uploading module 409. When the terminal key includes an asymmetric key, the public key uploading module 408 can export a public key of the terminal key and upload the public key to a specified server. The specified server can be a key management server configured to manage public keys of terminal keys. When the terminal key includes a symmetric key, the key uploading module 409 can export the terminal key and upload the terminal key to the key management server configured to manage public keys of terminal keys.

Figure 7:
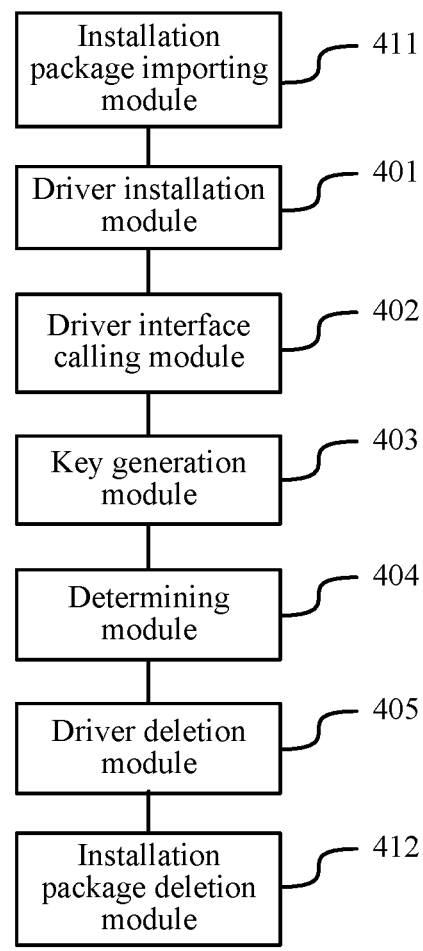
FIG. 7 is a block diagram of an apparatus for generating a terminal key according to another embodiment of the present disclosure.

FIG. 7 is a block diagram of an apparatus for generating a terminal key according to another embodiment of the present disclosure. The apparatus shown in FIG. 7 is similar to the apparatus shown in FIG. 4, except that the apparatus shown in FIG. 7 further includes an installation package importing module 411 configured to import an installation package of the driver into the terminal and an installation package deletion module 412 configured to delete the installation package of the driver from the terminal when it is determined that the terminal key is successfully generated.

Figure 8:
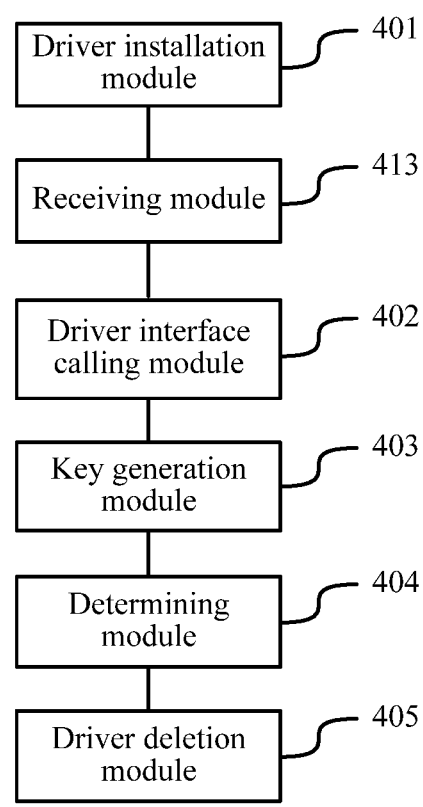
FIG. 8 is a block diagram of an apparatus for generating a terminal key according to another embodiment of the present disclosure.

FIG. 8 is a block diagram of an apparatus for generating a terminal key according to another embodiment of the present disclosure. The apparatus shown in FIG. 8 is similar to the apparatus shown in FIG. 4, except that the apparatus shown in FIG. 8 further includes a receiving module 413 configured to receive a call request sent by a key provider server. In this embodiment, the driver interface calling module 402 is further configured to, in response to the call request, call the terminal key generation instruction by using the interface provided by the driver.

Figure 9:
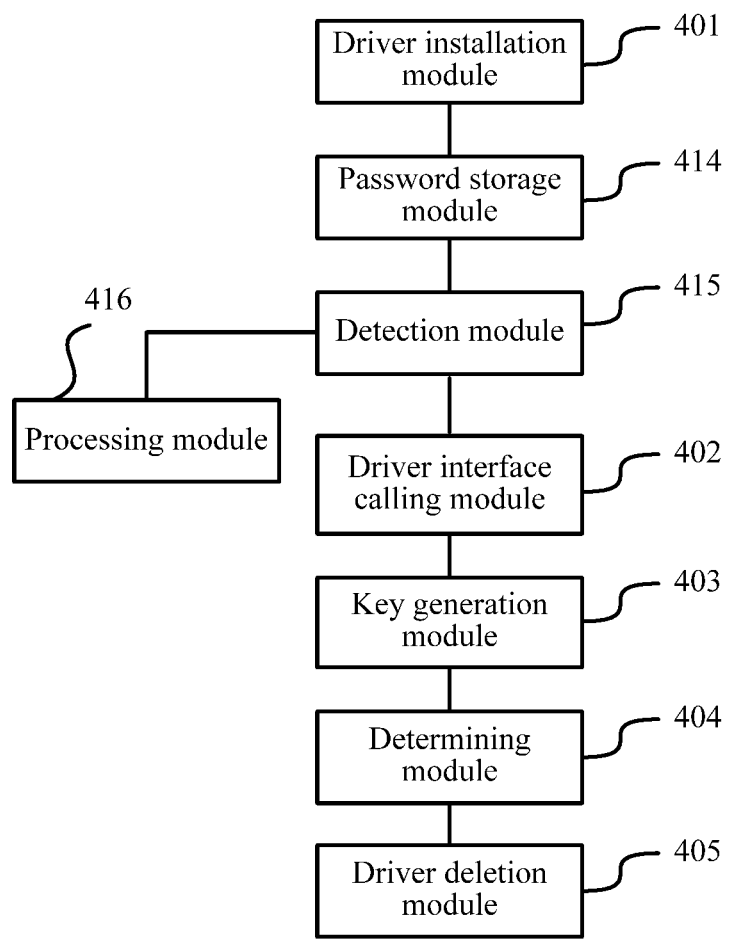
FIG. 9 is a block diagram of an apparatus for generating a terminal key according to another embodiment of the present disclosure.

FIG. 9 is a block diagram of an apparatus for generating a terminal key according to another embodiment of the present disclosure. The apparatus shown in FIG. 9 is similar to the apparatus shown in FIG. 4, except that the apparatus shown in FIG. 9 further includes a password storage module 414, a detection module 415, and a processing module 416.

The password storage module 414 is configured to store a calling password set by the key provider server for the interface provided by the driver. The calling password can be used to verify a caller of the interface provided by the driver.

The detection module 415 is configured to detect whether a password entered by the caller of the interface provided by the driver is the same as the calling password when the call request for the interface provided by the driver is received.

If the password entered by the caller of the interface provided by the specified driver is the same as the stored calling password, the driver interface calling module 402 can call the key generation instruction through the interface provided by the driver installed by the driver installation module 401.

The processing module 416 is configured to ignore the call request if the password entered by the caller of the interface provided by the specified driver is different from the stored calling password. In some embodiments, the specified driver is uninstalled or deleted after a predetermined number of successful or failed password input attempts.

The above functional modules are only described for illustration purposes when the apparatus for generating a terminal key provided by the foregoing embodiments generates a terminal key. In some other embodiments, the functions may be allocated to different functional modules according to specific needs, which means that the internal structure of the device is divided to different functional modules to complete all or some of the above described functions. In addition, the apparatus for generating a terminal key provided by the foregoing embodiments is based on the same concept as the method for generating a terminal key in the foregoing embodiments. For the specific implementation process, the method embodiments can be referenced to, and the details are not described herein again.

Figure 10:
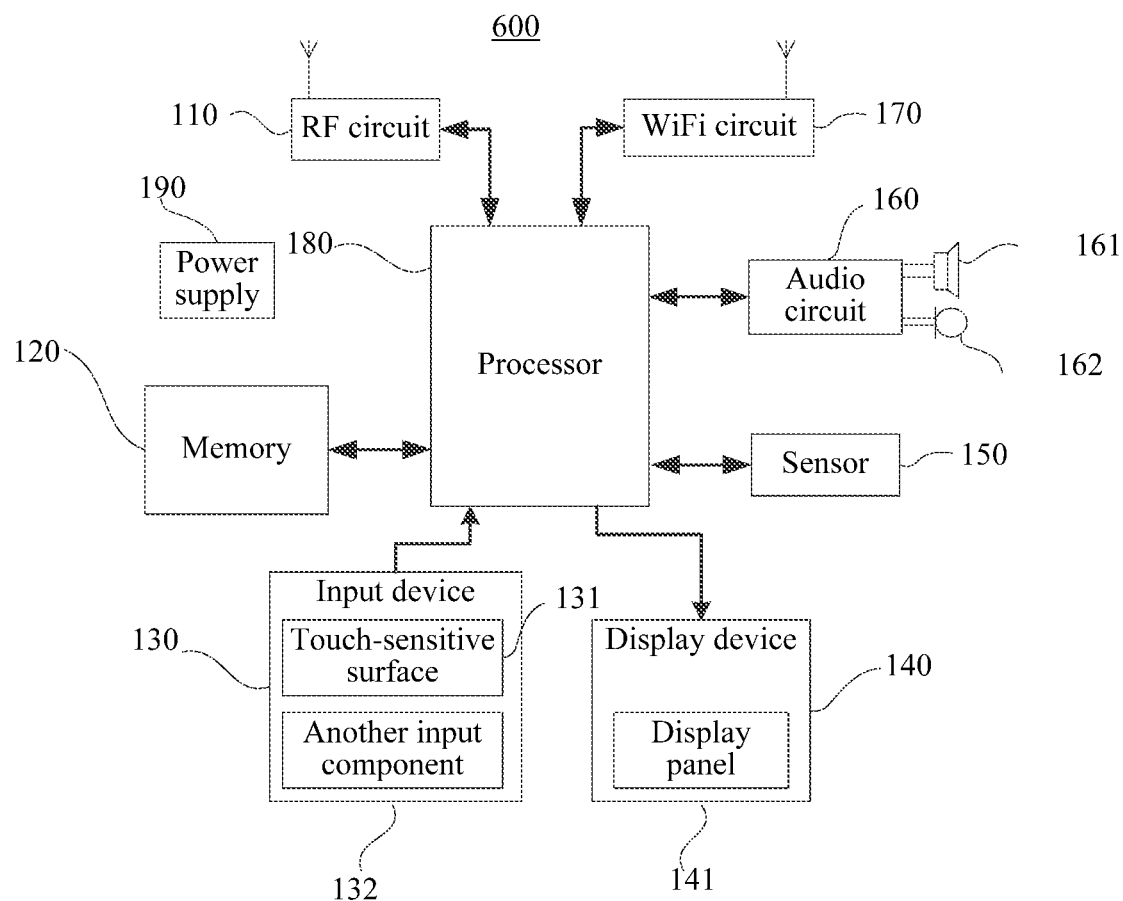
FIG. 10 is a schematic structural diagram of an apparatus for generating a terminal key according to an embodiment of the present disclosure.

FIG. 10 is a schematic structural diagram of a terminal 600 according to an embodiment of the present disclosure. The terminal may be configured to perform a method for generating a terminal key consistent with the present disclosure, such as one of the exemplary methods described above. As shown in FIG. 10, the terminal 600 includes a radio frequency (RF) circuit 110, a memory 120 including one or more computer readable storage media, an input device 130, a display device 140, a sensor 150, an audio circuit 160, a wireless Fidelity (WiFi) circuit 170, a processor 180 including one or more processing cores, and a power supply 190. A person skilled in the art may understand that the structure of the terminal shown in FIG. 10 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. In some embodiments, the RF circuit 110 receives downlink information from a base station, then delivers the downlink information to one or more processors 180 for processing, and sends related uplink data to the base station. In some embodiments, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In some embodiments, the RF circuit 110 may also communicate with a network and another device by wireless communication. The wireless communication may use any communications standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS), or the like.

The memory 120 may be configured to store a software program or module. The processor 180 runs the software program or module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created during use of the terminal 600, and the like. In some embodiments, the memory 120 may include a high speed random access memory, and may also include a non-volatile memory, such as at least one magnetic disk storage device, a flash memory, or another volatile solid-state storage device. Correspondingly, the memory 120 may further include a memory controller, so as to provide access of the processor 180 and the input device 130 to the memory 120.

The input device 130 may be configured to receive input digit or character information, and generate a keyboard, mouse, joystick, optical, or track ball signal input related to the user setting and function control. In some embodiments, the input device 130 may include a touch-sensitive surface 131 and another input component 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input device 130 may further include the another input component 132. In some embodiments, the another input component 132 may include, but is not limited to, one or more of a physical keyboard, a functional key (such as a volume control key or a switch key), a track ball, a mouse, or a joystick.

The display device 140 may be configured to display information input by the user or information provided for the user, and various graphical user interfaces of the terminal 600. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface, the touch-sensitive surface 131 transfers the touch operation to the processor 180, so as to determine the type of the touch event. Then, the processor 180 provides a corresponding visual output on the display panel 141 according to the type of the touch event. Although, in FIG. 10, the touch-sensitive surface 131 and the display panel 141 are used as two separate parts to implement input and output functions, in some embodiments, the touch-sensitive surface 131 and the display panel 141 may be integrated to implement the input and output functions.

The terminal 600 may further include at least one sensor 150 such as an optical sensor, a motion sensor, and other sensors. In some embodiments, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 600 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 600, are not further described herein.

The audio circuit 160, a speaker 161, and a microphone 162 may provide audio interfaces between the user and the terminal 600. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another mobile phone by using the RF circuit 110, or outputs the audio data to the memory 120 for further processing. The audio circuit 160 may further include an earplug jack, so as to provide communication between a peripheral earphone and the terminal 600.

WiFi is a short distance wireless transmission technology. The terminal 600 may allow, by using the WiFi circuit 170, the user to receive and send emails, browse a web page, access streaming media, and so on, which provides wireless broadband Internet access for the user. Although FIG. 10 shows the WiFi circuit 170, it is understood that the WiFi circuit 170 is not a necessary component of the terminal 600, and when needed, the WiFi circuit 170 may be omitted as long as the scope of the essence of the present disclosure is not changed.

The processor 180 is the control center of the terminal 600, and is connected to various parts of the mobile phone by using various interfaces and lines. By running or executing the software program and/or module stored in the memory 120, and invoking data stored in the memory 120, the processor 180 performs various functions and data processing of the terminal 600, thereby performing overall monitoring on the mobile phone. Optionally, the processor 180 may include one or more processing cores. In some embodiments, the processor 180 may integrate an application processor and a modem. The application processor mainly processes an operating system, a user interface, an application program, and the like. The modem mainly processes wireless communication. It is understood that the foregoing modem may be not integrated in the processor 180.

The terminal 600 further includes the power supply 190 (such as a battery) for supplying power to the components. In some embodiments, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 600 may further include a camera, a Bluetooth circuit, and the like, which are not further described herein. In some embodiments, the display device of the terminal is a touchscreen display, and the terminal further includes a memory and one or more programs. The one or more programs are stored in the memory and configured to be executed by one or more processors. The one or more programs include a program for performing the foregoing method for generating a terminal key.

Figure 11:
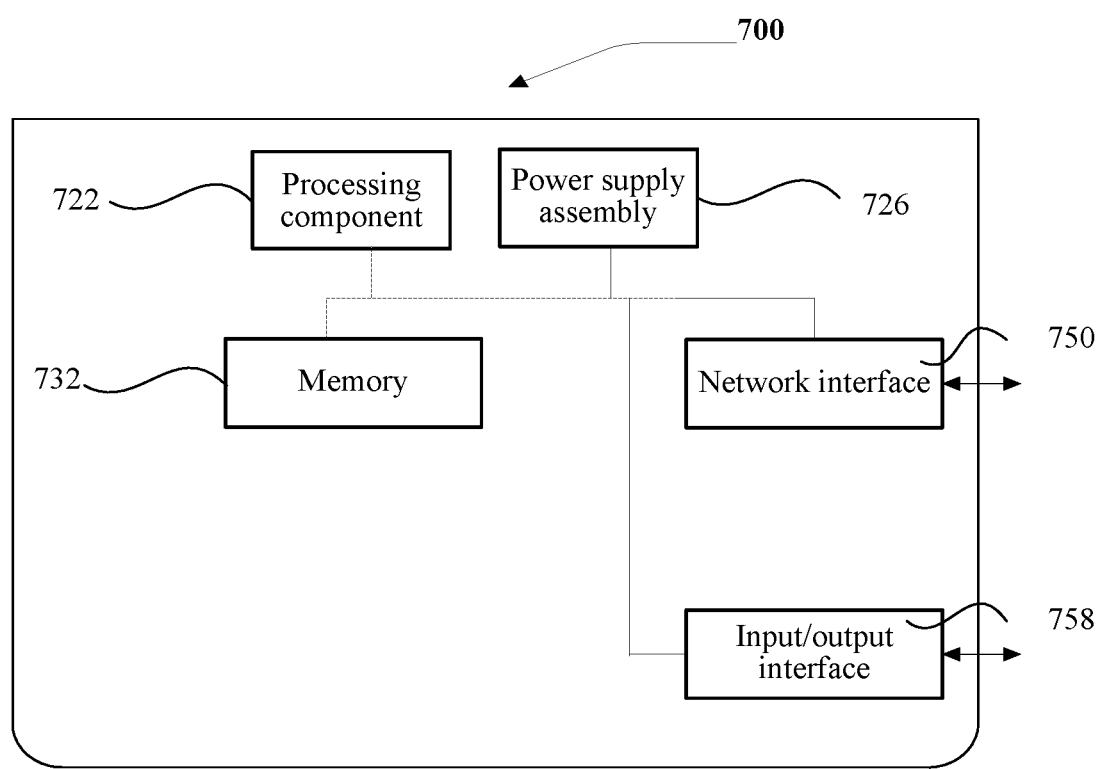
FIG. 11 is a schematic structural diagram of an apparatus for generating a terminal key according to another embodiment of the present disclosure.

FIG. 11 is a schematic structural diagram of an apparatus for generating a terminal key according to an embodiment of the present disclosure. For example, an apparatus 700 may be provided as a server, which is used as a key provider server for performing the method for generating a terminal key provided in the present disclosure. As shown in FIG. 11, the apparatus 700 includes a processing assembly 722 and a memory resource represented by a memory 732. The processing assembly 722 includes one or more processors. The memory 732 stores instructions that can be executed by the processing component 722, for example, an application program. The application program stored in the memory 732 may include one or more modules, each of the modules being corresponding to a set of instructions. In addition, the processing component 722 is configured to execute instructions, to perform a method for generating a terminal key consistent with the present disclosure, such as one of the exemplary methods described above.

The apparatus 700 further includes a power supply assembly 726 configured to execute power supply management of the apparatus 700, a wired or wireless network interface 750 configured to connect the apparatus 700 to a network, and an input/output (I/O) interface 758. The apparatus 700 may operate an operating system stored in the memory 732, for example, Windows Server™, Mac OS X™, Unix™, Linux™, FreeBSD™, or the like.

A person of ordinary skill in the art may understand that the entire or a part of a method consistent with embodiments of the disclosure, such as one of the above-described exemplary methods, may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely exemplary embodiments of the present disclosure, but are not intended to limit the present disclosure. Any modification, equivalent replacement, or improvement made within the spirit and principle of the present disclosure shall fall within the scope of the present disclosure.

What is claimed is:

1. A method for generating a terminal key, comprising:
installing a driver on a terminal;
calling, by the terminal in response to a call request sent by a key provider server, a terminal key generation instruction through an interface provided by the driver on the terminal;
generating, by the terminal, the terminal key in response to the terminal key generation instruction;
determining that the terminal key has been successfully generated when the terminal key is the same as a key generated by the key provider server by using same key generation data; and
deleting the driver from the terminal when the terminal key has been successfully generated.

2. The method according to claim 1, further comprising:
setting a calling password for the interface, the calling password being configured to verify a caller of the interface.

3. The method according to claim 1,
wherein the terminal key is an asymmetric key,
the method further comprising, after the driver is deleted from the terminal:
exporting a public key of the terminal key; and
uploading the public key to a key management server.

4. The method according to claim 1,
wherein the terminal key is a symmetric key,
the method further comprising, after the driver is deleted from the terminal:
exporting the terminal key; and
uploading the terminal key to a key management server.

5. The method according to claim 1, further comprising:
importing an installation package of the driver into the terminal before the driver is installed on the terminal; and
deleting the installation package from the terminal after the driver is deleted from the terminal.

6. The method according to claim 1, further comprising:
storing a calling password set by the key provider server for the interface, the calling password being configured to verify a caller of the interface.

7. The method according to claim 6, further comprising, before generating the terminal key in response to the terminal key generation instruction:
detecting, when the call request is received, whether a first password entered by the caller of the interface is the same as the stored calling password;
calling the terminal key generation instruction through the interface if the first password is the same as the stored calling password; and ignoring the call request if the first password is different from the stored calling password.

8. The method according to claim 1, further comprising: provisioning or installing the driver on the terminal.

9. The method according to claim 1, further comprising: transmitting from the terminal a signal indicating successful deletion of the driver.

10. The method according to claim 2, wherein the calling password for the interface is set by using a production line tool at a terminal manufacturer.

11. The method according to claim 2, wherein the calling password for the interface is set by writing the calling password into a program for generating the terminal key as a password parameter.

12. An apparatus for generating a terminal key, comprising:
a processor; and
a memory storing instructions that, when executed by the processor, cause the processor to:
   install a driver on a terminal;
   call, by the terminal in response to a call request from a key provider server, a terminal key generation instruction through an interface provided by the driver;
   generate, by the terminal, the terminal key in response to the terminal key generation instruction;
   determine that the terminal key has been successfully generated when the terminal key is the same as a key generated by the key provider server by using same key generation data; and
   delete the driver from the terminal when the terminal key has been successfully generated.

13. The apparatus according to claim 12, wherein the instructions further cause the processor to:
set a calling password for the interface, the calling password being configured to verify a caller of the interface.

14. The apparatus according to claim 12,
wherein the terminal key is an asymmetric key, and
the instructions further cause the processor to, after the driver is deleted from the terminal:
   export a public key of the terminal key; and
   upload the public key to a key management server.

15. The apparatus according to claim 12,
wherein the terminal key is a symmetric key, and
the instructions further cause the processor to, after the driver is deleted from the terminal:
   export the terminal key; and
   upload the terminal key to a key management server.

16. The apparatus according to claim 12, wherein the instructions further cause the processor to:
import an installation package of the driver into the terminal before the driver is installed on the terminal; and
delete the installation package from the terminal after the driver is deleted from the terminal.

17. The apparatus according to claim 12, wherein the instructions further cause the processor to:
store a calling password set by the key provider server for the interface, the calling password being configured to verify a caller of the interface.

18. The apparatus according to claim 17, wherein the instructions further cause the processor to, before generating the terminal key in response to the terminal key generation instruction:
   detect, when the call request is received, whether a first password entered by the caller of the interface is the same as the stored calling password;
   call the terminal key generation instruction through the interface if the first password is the same as the stored calling password; and
   ignore the call request if the first password is different from the stored calling password.

19. A non-transitory computer-readable storage medium, storing instructions that, when executed by a processor, cause the processor to:
   install a driver on a terminal;
   call, by the terminal in response to a call request from a key provider server, a terminal key generation instruction through an interface provided by the driver;
   generate, by the terminal, a terminal key in response to the terminal key generation instruction;
   determine that the terminal key has been successfully generated when the terminal key is the same as a key generated by the key provider server by using same key generation data; and
   delete the driver from the terminal when the terminal key has been successfully generated.

20. A method for generating a terminal key, comprising:
installing a driver on a terminal;
calling, by the terminal in response to a call request sent by a key provider server, a terminal key generation instruction through the driver provided on the terminal to generate, by the terminal, the terminal key in response to the terminal key generation instruction;
determining that the terminal key has been unsuccessfully generated when the terminal key is not the same as a key generated by the key provider server by using same key generation data; and
deleting the driver from the terminal after a specified number of unsuccessful attempts to generate the terminal key.

* * * * *